United States Patent

[11] 3,560,757

[72] Inventor Peter C. Pugsley
Pinner, Middlesex, England

[21] Appl. No. 843,131
[22] Filed July 18, 1969
[45] Patented Feb. 2, 1971
[73] Assignee Crosfield Electronics Limited
London, England
a British company
[32] Priority July 22, 1968
[33] Great Britain
[31] 34792/68

[54] CIRCUIT FOR GENERATING BLACK-PRINTER SIGNAL IN COLOR PRINTING APPARATUS
4 Claims, 1 Drawing Fig.

[52] U.S. Cl. .......... 250/219, 250/226; 355/38
[51] Int. Cl. .......... G01n 21/18
[50] Field of Search .......... 250/219, 226; 355/38

[56] References Cited

UNITED STATES PATENTS

| | | | |
|---|---|---|---|
| 2,968,214 | 1/1961 | Kilminster | 355/38 |
| 3,041,932 | 7/1962 | Kilminster | 250/226 |
| 3,124,036 | 3/1964 | Hell et al. | 250/226 |

*Primary Examiner*—James W. Lawrence
*Assistant Examiner*—Martin Abramson
*Attorney*—Kemon, Palmer & Estabrook

ABSTRACT: In color printing, a circuit for generating a black printer signal has means for varying a selectivity factor which permits adjustment of the amount of black in colored areas while leaving it substantially unchanged in neutral areas. This variation is accomplished without substantial alteration of the scale factor of the black printer signal. The circuit includes maximum and minimum signal selector circuits receiving the color component signals and supplying the maximum and minimum signals to the two inputs of a differential amplifier having a feedback path to a first of the two inputs. The selectivity factor depends on the ratio of resistances in the feedback path and in the first input path.

PATENTED FEB 2 1971 3,560,757
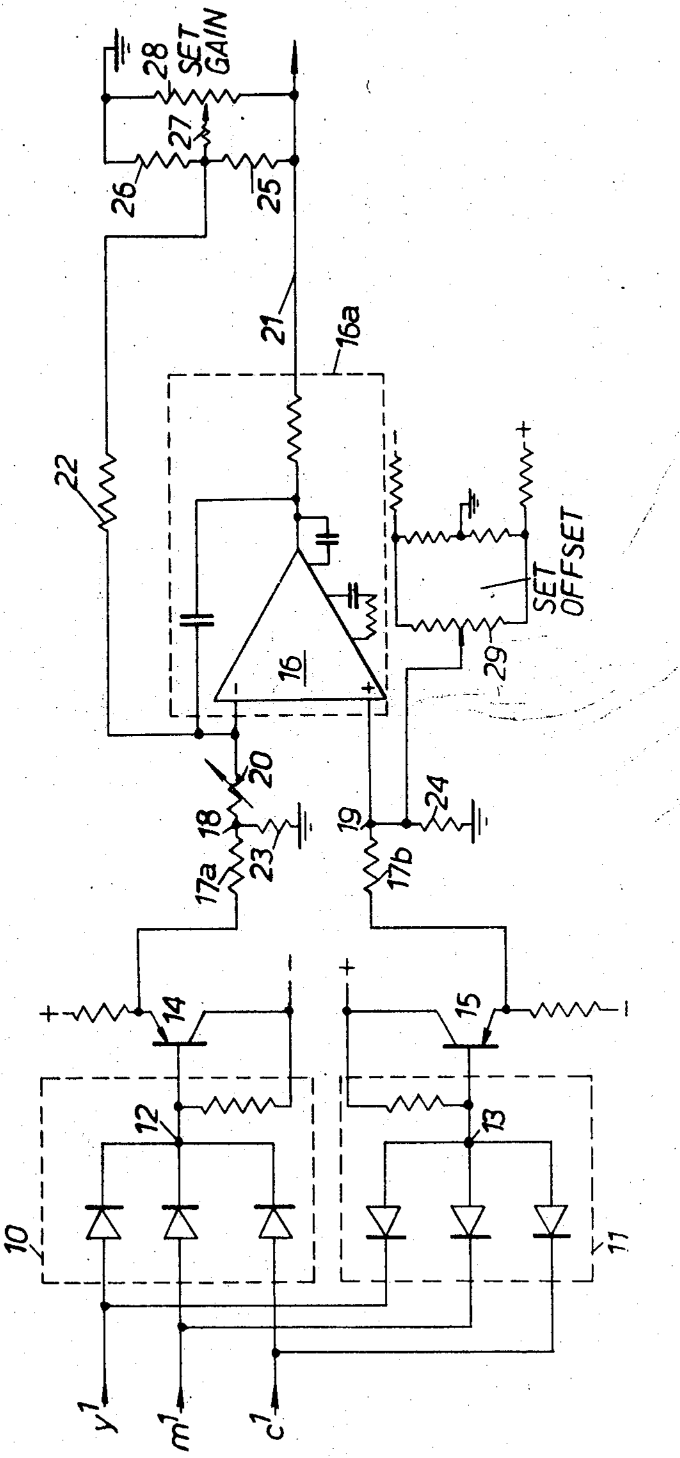
Inventor
Peter C. Pugsley
By
Kemon, Palmer + Estabrook
Attorneys

CIRCUIT FOR GENERATING BLACK-PRINTER SIGNAL IN COLOR PRINTING APPARATUS

In one method of image reproduction, the image to be reproduced is scanned element by element by an analyzing scanner which includes a photoelectric device. The electric signal generated by this device is modulated in accordance with the tonal values of the successively scanned elements of the image and this signal is used to control the brightness of an exposing light source which executes a similar scanning pattern in relation to a light-sensitive sheet on which the image will be reproduced. This electro-optical scanning is of particular advantage in colour reproduction, since the colour component signals of can be combined and modified to make the corrections required by nonlinearities in different parts of the image-reproducing process and additionally to permit the use of a black printer. When a block printer is used in addition to the printers for the cyan, magenta and yellow inks, the black printer replaces equal amounts of these three colour inks. Thus, the maximum amount of black ink that can be used for any element of the image is equal to the minimum of the three colour ink quantities which would be required for that element in the absence of a black printer. If this maximum quantity of black ink is used, corresponding amounts of "undercolour" must be removed from each of the colour printers so that the minimum colour printer is reduced to zero for this element. For grey tones, the three colour printers require equal amounts of ink in a three-colour system and can be entirely replaced by a black printer in a four-colour system.

However, the printing of the maximum possible quantity of ink is not always desirable in "coloured" areas although it is generally desirable in neutral areas, that is to say areas in which the required amounts of the three coloured inks are equal. To permit the black printer to be reduced in coloured areas while retaining its maximum value in neutral areas, it is known to generate a black printer signal in accordance with the formula $$B=\frac{1}{1-s}(S-sL)$$

In this formula L represents the largest of three colour printer signals, S the smallest, $s$ a selectivity factor and B the black printer signal. It will be seen that when the colour signals are equal (i.e. when S equals L), the black printer signal is equal to the colour signals; but when the colour signals are unequal, the black signal is somewhat smaller than the smallest colour signal S, unless $s$ is zero. As $s$ is made larger, the black is reduced in coloured areas but remains unaffected in neutral areas.

In existing circuits for realizing this equation several components must be changed if the value of $s$ is to be altered without at the same time changing the scale factor of B.

The present invention has for its object to provide a circuit for generating this function in such a manner that the value of $s$ can be changed very simply without altering the scale factor of B. According to the present invention, in the black printer circuit of a scanning image-reproducing apparatus the colour component signals are applied to maximum and minumum signal selector circuits, the minimum signal is applied to the noninverting input of a differential amplifier and the maximum signal is applied through a first resistance to the inverting input of the differential amplifier, the amplifier output being connected through a feedback resistance to the junction of the first resistance and the said inverting input of the amplifier. With such a circuit, the value of $s$ can be changed, without altering the scale factor of B, simply by altering the ratio of the input resistance to the feedback resistance. This is most conveniently done by providing a variable input resistor in the path of the maximum signal.

In order that the invention may be better understood, one example will now be described with reference to the accompanying drawing.

In the drawing, corrected yellow, magenta and cyan signals $y'$, $m'$ and $c'$ are applied to a maximum signal selector circuit 10 and independently to a minimum signal selector circuit 11. The circuits 10 and 11 are of conventional design. In the circuit 10, the largest of the three input signals passes through its diode and appears at the junction 12, thereby biasing the other two diodes against conduction. Similarly, the junction 13 in the circuit 11 is held close to the potential of the minimum signal by virtue of the diode in the path of this minimum signal and thereby biases the other two diodes of the circuit 11 against conduction.

The maximum and minimum signals are applied through buffer stages 14 and 15 to a differential amplifier 16. Each buffer stage consists of a transistor connected as an emitter follower.

The signals from the buffer stages 14 and 15 are applied through resistors **17*a* and 17*b* of equal value to points 18 and 19. From point 19 the minimum signal is applied directly to the noninverting input of the amplifier 16. From point 18 the maximum signal is applied through an adjustable resistor 20 (or through) one of a number of fixed resistors of different value) to the inverting input of the amplifier 16**.

The output of the differential amplifier appears on the line 21 and a feedback signal is derived from the output and is applied by way of a feedback resistor 22 to the inverting input of the amplifier 16.

The amplifier 16 is a monolithic integrated-circuit differential amplifier of the kind known as "type 709." For example, it may be a type 709 differential amplifier made by Fairchild Camera and Instrument Corporation under the designation 709C. The components shown within the dotted box **16*a*** are necessary to ensure high frequency stability of the amplifier and are connected to the amplifier in a well known manner.

In the circuit shown, both input voltages are halved by the connection of resistors 23 and 24, equal in value to resistors **17*a* and 17*b*, between the junctions 18 and 19 respectively and earth. In a similar manner, the output voltage applied to the feedback circuit is halved by the equal resistors 25 and 26 connected in series between the output line 21 and earth, the feedback resistor 22 being connected to the midpoint of these resistors. The resistors 23, 24, 25 and 26 are not necessary for the operation of the circuit, that is to say it is not essential to halve the input and feedback voltages in this way. It is, however, convenient in practice to have these resistors in the circuit to facilitate the inclusion of offset and gain-setting potentiometers. The values of resistors 23 and 24 may be different from those of resistors 16 and 17 but the ratio of resistor 16 to resistor 23 must be the same as that of resistor 17 to resistor 24 for proper operation of the circuit. If it is desired to produce an output with the same scale factor as the input, then the same ratio should exist between resistors 25 and 26**.

The midpoint of resistors 25 and 26 is also connected through a further resistor 27 to a potentiometer 28 for setting the gain of the circuit. The junction 19 at the noninverting input is connected to a potentiometer 29 for adjusting the "offset" voltage, that is to say the voltage which is required to balance the two halves of the differential amplifier.

Ignoring the small disturbing effect of the offset and gain controls, it can be shown that the output voltage equals $$\left(1+\frac{R_{22}}{R_{\text{eff}}}\right)S-\frac{R_{22}}{R_{\text{eff}}}L$$

where R22 is the resistance of resistor 22 and $R_{eff}$ is the effective a value of the variable selectivity input resistor, that is to say the resistance of resistor 20 in combination with the effective source resistance at the junction of resistors **17*a* and 23**.

On putting $\frac{R_{22}}{R_{\text{eff}}}=\frac{s}{1-s}$ this reduces to the expression previously given for B.

The value of $s$ lies between zero and 1 and is typically about 0.2 or 0.3. If the equation for B gives a negative value, B is treated as zero.

It will be appreciated that if the colour signals are negative-going instead of positive-going, the directions of the diodes in the maximum and minimum selector circuits must be reversed.

I claim:

1. Apparatus for reproducing an image in colour and having means for scanning, element by element, an original or a set of colour separations obtained from the original to derive electric signals representing variations of different colour components of the original and a circuit responsive to the said signals to generate a black printer signal, the circuit comprising maximum and minimum signal-selector circuits each connected to receive the said colour-component electric signals; a differential amplifier having its noninverting input connected to the minimum signal-selector circuit to receive the minimum colour-component signal and having its inverting input connected through a first resistance to the maximum signal-selector circuit to receive the maximum colour-component signal; and a feedback path including a feedback resistance between the output of the differential amplifier and the junction of the first resistance and the said inverting input, whereby adjustment of the ratio of the said resistances varies the black-printer selectivity factor without substantially altering the scale factor of the black printer signal.

2. Apparatus in accordance with claim 1, in which the outputs of the maximum and minimum selector circuits are respectively connected to individual voltage dividers, a tapping on the divider associated with the minimum signal being connected to the noninverting input of the differential amplifier and a corresponding tapping on the divider associated with the maximum signal being connected through the said first resistance to the inverting input of the differential amplifier, the noninverting input being also connected to an amplifier-balancing potentiometer.

3. Apparatus in accordance with claim 2, in which a voltage divider is connected across the differential amplifier output and the feedback signal is derived from a tapping on the voltage divider such that the fraction of the output voltage applied to the feedback circuit is the same as the fraction of the maximum and minimum colour signals obtained from the voltage dividers to which these signals are applied.

4. Apparatus in accordance with claim 3, in which the tapping on the voltage divider in the output circuit is additionally connected to gain-setting potentiometer connected across the output of the amplifier.